Feb. 24, 1925.  1,527,874
H. P. HOOD
REFRACTORY PRODUCT AND METHOD OF PRODUCING SAME
Filed Jan. 26, 1922

INVENTOR
Harrison P. Hood
BY
ATTORNEY

Patented Feb. 24, 1925.

1,527,874

UNITED STATES PATENT OFFICE.

HARRISON P. HOOD, OF CORNING, NEW YORK, ASSIGNOR TO CORNING GLASS WORKS, OF CORNING, NEW YORK, A CORPORATION OF NEW YORK.

REFRACTORY PRODUCT AND METHOD OF PRODUCING SAME.

Application filed January 26, 1922. Serial No. 531,970.

*To all whom it may concern:*

Be it known that I, HARRISON P. HOOD, a citizen of the United States, residing at Corning, in the county of Steuben, State of New York, have invented new and useful Improvements in Refractory Products and Methods of Producing Same, of which the following is a specification.

This invention has for its object to provide a new refractory product for use in manufacturing bricks, blocks or tiles that are used in the construction of or the lining of glass melting tanks, furnaces; and also such containers as pots and crucibles, where a highly refractory material is desirable to resist the solvent action of glass or other liquid substances, and to a novel method of manufacturing the same, whereby a product of greatly superior character is obtained.

I have found that aluminum silicate in the form of sillimanite ($Al_2O_3SiO_2$) when worked up into the desired form can be used in lieu of the usual clay refractories in the various containers for molten glass for the purpose had in view.

In the present case there is described as an embodiment of my invention a method of manufacturing tank blocks, fire-bricks, tiles, melting pots, crucibles, or other similar articles out of an aluminum silicate material, and in the following description the term "block" is used for the sake of brevity, as my invention is not limited to any form of article.

In the accompanying drawings:—

Figure 1:
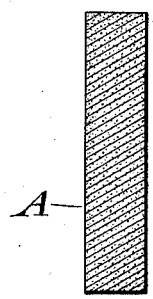
Figure 1, is a section through a tank block composed of sillimanite manufactured in accordance with one form of my invention.

In accordance to one embodiment of my invention, for the purpose of manufacturing a block or in preparing the material for the purpose of forming blocks or other suitable apparatus the ingredients, preferably in the form of artificial sillimanite, are first ground to a fine powder. I have ground the material to about 400 mesh with satisfactory results, but if increased strength and finer grain is desired in the final product, the particles should be ground to about 800 mesh or finer.

At the completion of the grinding operation each particle of the material will be composed of pure sillimanite. To this powdered material is added sufficient liquid to form a soft paste. Such liquid can be, water, or a solution of silicic acid, or a solution of hydrate of alumina or a solution or hydrosol of silicic acid and hydrate of alumina in the desired proportion or gels of these colloidal solutions. By gel is meant the semi-solid produced when the colloidal particles in the solutions or hydrosols partially agglomerate and precipitate. While water can be used with satisfactory results as a liquid for forming the paste, other liquids such as silicic acid in solution, or a true or colloidal solution of hydrate of alumina, or a solution or hydrosol of silicic acid three parts, and hydrate of alumina five parts, such solution being composed of alumina and silica in the molecular ratio of 1 to 1, have been found as suited for the purpose of providing binding agents for the powdered sillimanite. When either of the above mentioned liquids is used for forming the paste in lieu of water, such solutions will form a coat in the form of a thin film over each particle of the powdered sillimanite during the mixing of the paste. This film is desirable, as it fuses or sinters at a lower temperature than the particles themselves when the mass is being fired, and in doing so the films will act as binders for uniting the particles of sillimanite.

The excess liquid can be removed from the paste by decantation or otherwise, and then the paste can be built up or molded to any desired shape by means of suitable forms. The forms by preference should be lined with a liquid-absorbing material, such as cloth or blotting paper. The paste is permitted to set in the forms, and while the setting action is taking place, the forms may be shaken from time to time to cause the closest packing and fitting together of the various sized and shaped particles, while the remaining liquid evaporates and drains off.

When the paste is dried, the blocks may then be fired to a temperature necessary to cause a sintering of the material. In the firing operation the blocks may, if so desired, be first heated to a temperature of approximately 1000° C. to bake the material whereby the blocks will be strong enough to permit handling and finishing by grinding, cutting, or chipping into the desired shape without causing them to disintegrate. Then the blocks may be heated to a temperature of about 1400° C. to 1450° C. for firmly sintering the material.

Figure 2:
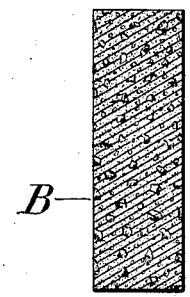
Fig. 2, is a similar view of a tank block composed of sillimanite manufactured in accordance with another form of my invention.

The specific gravity of a block A (see Fig. 1) formed in the above described manner is about 2.2, while the specific gravity of pure crystalline sillimanite is about 3.2; therefore, if increased density is needed or desired in the final product, such increased density may be attained by adding larger sized particles of pure sillimanite to the paste before molding, as shown by the block B, Fig. 2.

If the blocks, after being fired to a temperature of about 1400° to 1450° C. are found to be porous, the exterior surfaces thereof can be glazed by means of a flame of sufficient temperature to cause a melting or fusion of the particles of sillimanite. The temperature of the flame should be sufficient to heat the surface of the blocks to about 1800° C., for at this temperature the sillimanite will commence to melt, thereby closing all exterior pores, and in this manner prevent molten glass from being absorbed in the blocks with perhaps a slight injurious effect thereto. It is to be understood that in most instances the amount of porosity in the blocks will not be detrimental to their use in glass melting containers, but if this porosity is too great, the blocks can be subjected to a flame in the manner above pointed out to cause a fusion of the exterior particles of sillimanite.

Figure 3:
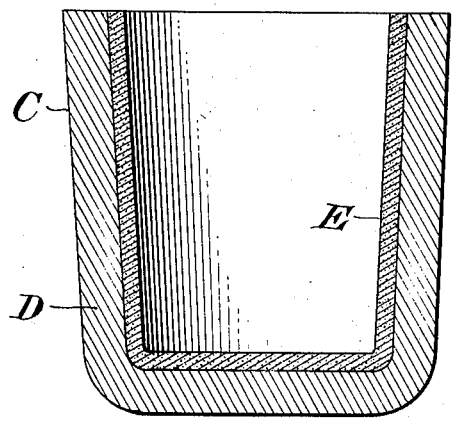
Fig. 3, is a vertical section of a pot or crucible having a lining of sillimanite.

Referring to Figure 3 of the drawings, a pot C having an outer shell D of clay or other suitable refractory, may be built in a manner similar to the usual practice in forming such articles, and when the material has set, it can be lined, as at E, with a paste formed of powdered sillimanite, in the manner heretofore described. When the paste has set, the pot C can be fired in the usual manner.

As molten glass has the tendency to dissolve the walls of the ordinary clay pots, and as it has been found that an aluminum silicate preferably in the form of sillimanite ($Al_2O_3SiO_2$) will retard the solvent action of molten glass when a pot is constructed in the above described manner, its length of usefulness will be greatly prolonged.

Figure 4:
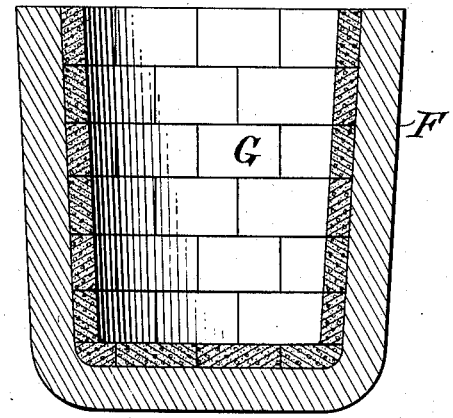
Fig. 4, is a similar view of another form of pot or crucible lining.

As an alternate mode of providing a pot with a lining of sillimanite, there is shown in Fig. 4, a pot F having tiles G that are formed of pure sillimanite. By preference the tiles G can be cemented to the interior of the pot F by means of a paste composed in whole or a part, of powdered sillimanite mixed with water. Such paste will, upon the pot being heated to a high temperature, cement the tiles G to the walls of the pot.

Having thus described my invention what I claim is:—

1. In the manufacture of refractory products from sillimanite, the method which comprises steps of reducing the sillimanite to a fine powder, then mixing with water to form a paste, and then shaping and firing to cause a sintering of the material.

2. In the manufacture of refractory products of sillimanite the method which comprises the steps of grinding the sillimanite to a fine powder, then mixing with water to form a paste, then shaping and firing to cause a partial sintering of the material, then cooling and shaping, and then firing at a higher temperature to cause a further sintering of the material.

3. In the manufacture of refractory products the method which comprises the steps of grinding sillimanite to a fine powder, then mixing with water to form a paste, then drying the paste and firing at about 1000° C. to cause a baking of the material, then cooling and shaping, and then firing to about 1400° C. to 1450° to cause a sintering of the material.

4. In the manufacture of refractory products, the method which comprises the steps of grinding crystalline aluminum silicate consisting of sillimanite (63.2% $Al_2O_3$ and 36.8% $SiO_2$) to a powder, then adding sufficient water to form a paste, then shaping the paste in a suitable mold, and then firing to cause a sintering of the material.

5. In the manufacture of refractory products the method which comprises the steps of grinding crystalline aluminum silicate ($Al_2O_3SiO_2$) to a fine powder, then mixing with a liquid carrying a binding material to form a paste, and then shaping and firing to cause a sintering of the binding material.

6. In the manufacture of refractory products the method which comprises the steps of grinding sillimanite to a fine powder, then mixing with a silicic acid solution as binding material for the powdered sillimanite to form a paste, and then shaping and firing to cause a sintering of the binding material.

7. In the manufacture of refractory products the method which comprises the steps of grinding sillimanite to a fine powder, then mixing with a silicic acid solution as binding material to form a paste, then drying the paste and firing at about 1000° C. to cause a partial fusion or sintering of the binding material, then cooling and shaping, and then firing to about 1400° C. to 1450° C. to cause a further fusion or sintering of the binding material.

8. In the manufacture of refractory products the method which comprises the steps of grinding sillimanite to a fine powder, then mixing with a solution of hydrate of alumina as binding material for the powdered sillimanite to form a paste, and then shaping and firing to cause a sintering of the binding material.

9. In the manufacture of refractory products the method which comprises the steps of grinding sillimanite to a fine powder, then mixing with a solution of hydrate of alumina as binding material to form a paste, then drying the paste and firing at about 1000° C. to cause a partial sintering of the binding material, then cooling and shaping, and then heating to about 1400° C. to cause a fusion or sintering of the binding material.

10. In the manufacture of refractory products from sillimanite the method which comprises the steps of grinding the sillimanite to a fine powder, then mixing with a liquid binding material containing the same constituents or hydrates thereof as the sillimanite to form a paste, and then shaping and firing to cause a sintering of the binding material.

11. In the manufacture of refractory products of sillimanite the method which comprises the steps of grinding the sillimanite to a fine powder, then mixing with a liquid carrying a binding material having the same constituents as the sillimanite to form a paste, then shaping and firing to cause a partial sintering of the binding material, then cooling and shaping, and then firing at a higher temperature to cause a further sintering of the binding material.

12. In the manufacture of refractory products the method which comprises the steps of grinding sillimanite to a fine powder, then mixing with a solution or hydrosol of hydrate of alumina and silicic acid as binding material to form a paste, then drying the paste and firing at about 1000° C. to cause a partial sintering of the binding material, then cooling and shaping, and then heating to about 1400° C. to cause a further sintering of the binding material.

13. A refractory product consisting of sillimanite in the form of finely ground particles, the exterior surface of which has been fused.

14. A refractory product consisting of sillimanite in the form of fine and coarse particles, the exterior surface of which has been fused.

15. A refractory product consisting of an alumina silicate material in the form of sillimanite (63.2% $Al_2O_3$ and 36.8% $SiO_2$) having its interior sintered and its exterior glazed.

16. As a new article of manufacture, a tank block formed of sillimanite, the exterior of the block being glazed.

17. As a new article of manufacture, a refractory brick formed of sillimanite, the exterior of the brick being glazed.

18. In the manufacture of refractory products the method which comprises the steps of grinding a crystalline aluminum silicate material consisting of sillimanite (63.2% $Al_2O_3$ and 36.8% $SiO_2$) to a fine powder, then mixing with a liquid to form a paste, then shaping the paste in a suitable mold until it is dry, then firing to cause a sintering of the material, and then glazing the exterior surface.

19. In the manufacture of refractory products of sillimanite the method which comprises the steps of grinding the sillimanite to a fine powder, then mixing with a liquid to form a paste, then shaping and firing to cause a partial sintering of the material, then cooling and shaping, then firing at a higher temperature to cause further sintering of the material, and then glazing the exterior surface.

20. In the manufacture of refractory products the method which comprises the steps of grinding sillimanite to a fine powder, then mixing with a liquid to form a paste, then drying the paste and firing at about 1000° C. to cause a partial sintering of the material, then cooling and shaping, then heating to about 1400° C. to cause a further sintering of the material, and then glazing the exterior surface by heating to about 1800° C. by means of a flame.

In testimony whereof, I hereunto sign my name this 24th day of January, 1922.

HARRISON P. HOOD.